US008369078B2

(12) United States Patent
Tang et al.

(10) Patent No.: US 8,369,078 B2
(45) Date of Patent: Feb. 5, 2013

(54) LOCKING APPARATUS

(75) Inventors: Xue-Dong Tang, Shenzhen (CN); Wei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 237 days.

(21) Appl. No.: 12/883,005

(22) Filed: Sep. 15, 2010

(65) Prior Publication Data
US 2012/0008274 A1 Jan. 12, 2012

(30) Foreign Application Priority Data

Jul. 7, 2010 (CN) .......................... 2010 1 0218963

(51) Int. Cl.
*H05K 5/00* (2006.01)
*H05K 7/00* (2006.01)
(52) U.S. Cl. ......... 361/679.33; 361/679.34; 361/679.35; 361/679.36; 361/679.37; 361/679.38; 361/679.39

(58) Field of Classification Search ............. 361/679.33, 361/679.34, 679.35, 679.36, 679.37, 679.38, 361/679.39
See application file for complete search history.

(56) References Cited

U.S. PATENT DOCUMENTS

| | | | | |
|---|---|---|---|---|
| 6,305,660 B1 * | 10/2001 | Liao | .............................. | 248/694 |
| 6,394,509 B1 * | 5/2002 | Kurek, III | ..................... | 292/199 |
| 6,935,604 B2 * | 8/2005 | Chen | ............................. | 248/694 |
| 7,038,907 B2 * | 5/2006 | Chen | ........................ | 361/679.33 |
| 7,259,959 B2 * | 8/2007 | Tu et al. | .................. | 361/679.33 |
| 7,623,345 B2 * | 11/2009 | Shih | ........................ | 361/679.58 |
| 7,755,886 B2 * | 7/2010 | Peng et al. | ............... | 361/679.33 |
| 2007/0119793 A1 * | 5/2007 | Peng et al. | ....................... | 211/26 |

* cited by examiner

*Primary Examiner* — Anthony Haughton
(74) *Attorney, Agent, or Firm* — Altis Law Group, Inc.

(57) ABSTRACT

A locking apparatus of a CD-ROM drive includes a support and a transmitting wheel. The support includes a shaft and a clasp formed thereon. The support is arranged in a chassis of the locking apparatus. The shaft and the clasp are received in the transmitting wheel. The clasp is configured for clasping the transmitting wheel.

12 Claims, 4 Drawing Sheets

LOCKING APPARATUS

BACKGROUND

1. Technical Field

The disclosure relates generally to locking apparatuses, and more particularly to a locking apparatus for a CD-ROM drive.

2. Description of the Related Art

Normally, a clasp only engages one point of a transmitting wheel of a CD-ROM. Unpleasant noise is, however, generated when the transmitting wheel rotates. Thus, what is called for is a locking apparatus that can overcome the limitations described.

BRIEF DESCRIPTION OF THE DRAWINGS

The components of the drawings are not necessarily drawn to scale, the emphasis instead being placed upon clearly illustrating the principles of the embodiment of a locking apparatus. Moreover, in the drawings, like reference numerals designate corresponding parts throughout several views.

DETAILED DESCRIPTION

Figure 1:
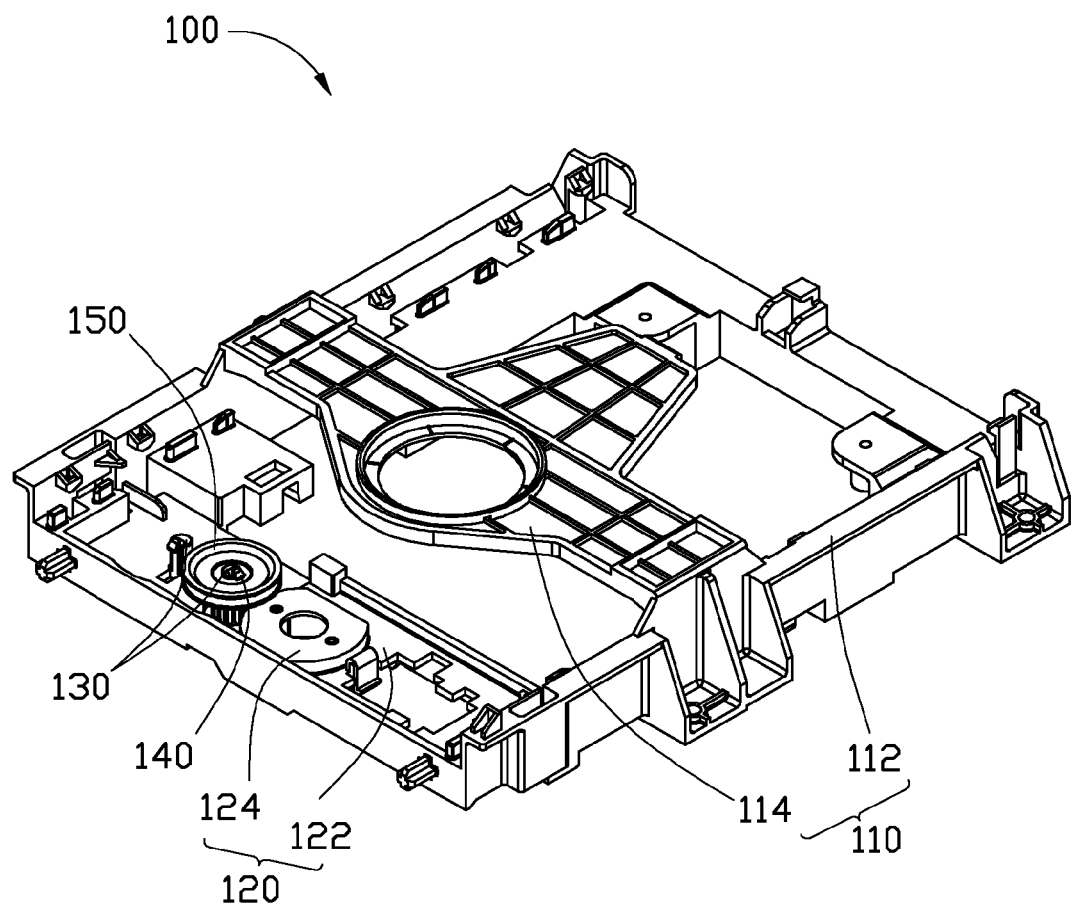
FIG. 1 is an isometric view of a locking apparatus in accordance with one embodiment of the disclosure.

Referring to FIG. 1, a locking apparatus 100 for a CD-ROM in accordance with one embodiment of the disclosure includes a chassis 110, a support 120, a shaft 130, a clasp 140 and a transmitting wheel 150.

The support 120 is mounted on the chassis 110 and configured for supporting the transmitting wheel 150. The shaft 130 is formed on the support 120. The clasp 140 is formed on the support 120 and adjacent to the shaft 130. The transmitting wheel 150 is configured for receiving the shaft 130 and the clasp 140.

The chassis 110 includes a casing 112 and a tray 114. The tray 114 is mounted on the casing 112. The tray 114 is configured for supporting a rotor of a CD (not shown).

Figure 2:
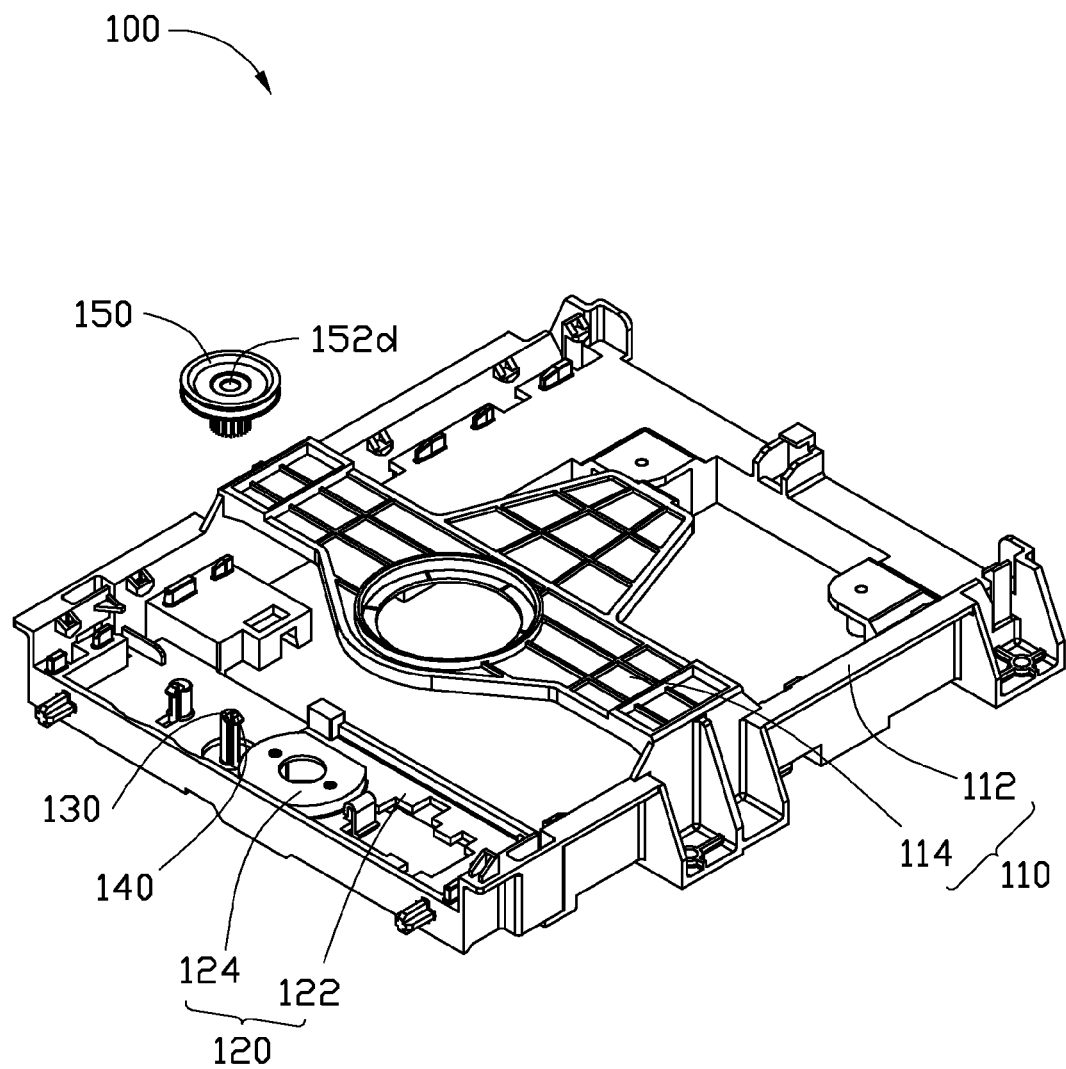
FIG. 2 is an exploded view of the locking apparatus in FIG. 1.
Figure 3:
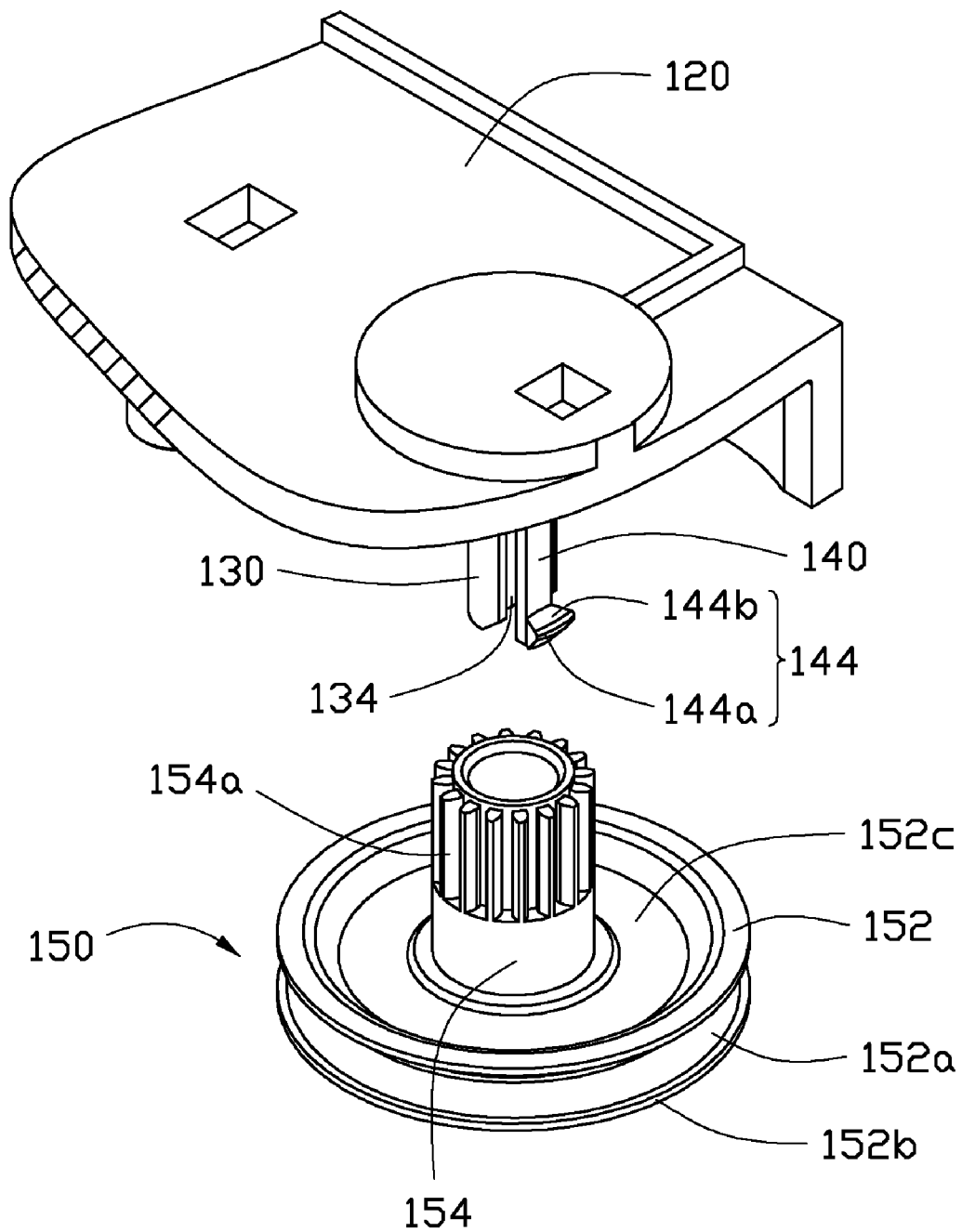
FIG. 3 is an isometric view of a support, a clasp and a transmitting wheel of the locking apparatus in FIG. 1.
Figure 4:
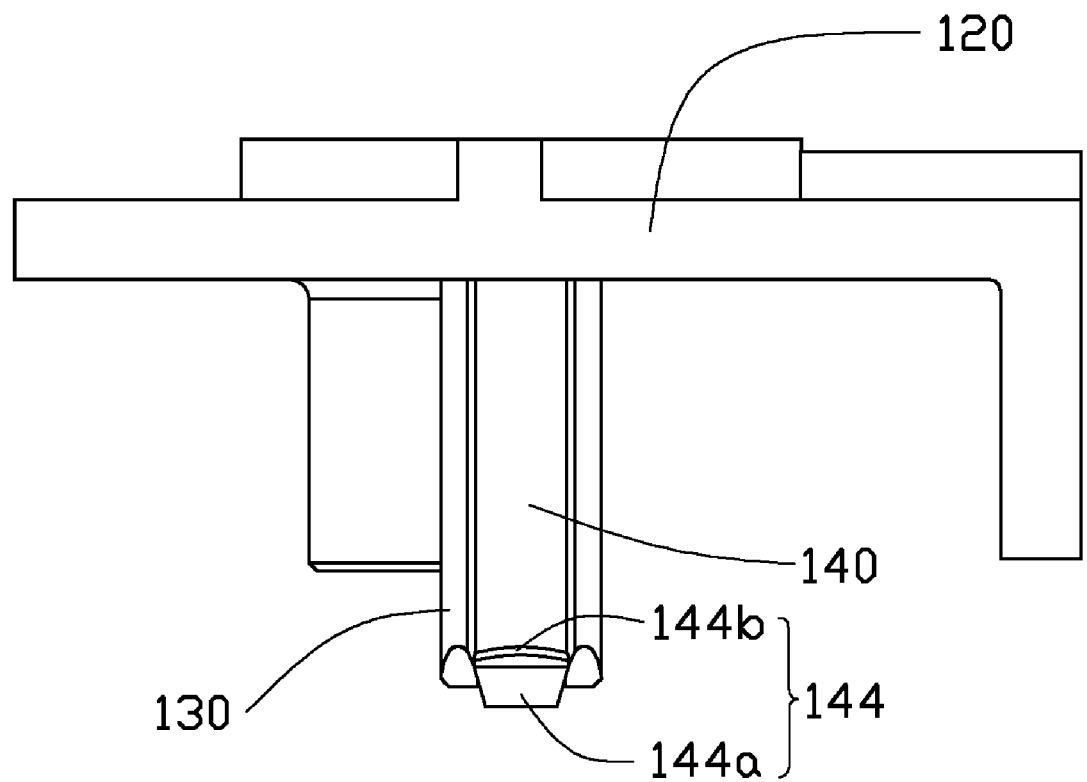
FIG. 4 is a lateral view of the support and the clasp of the locking apparatus in FIG. 1.

Referring to FIGS. 2-4, the support 120 is arranged at one side of the casing 112. The support 120 includes a supporting plate 122 and a hollow protrusion 124 formed on the middle of the supporting plate 122. The hollow protrusion 124 is configured for seating a motor (not shown).

The shaft 130 and the clasp 140 are formed on the supporting plate 122. The shaft 130 is essentially columnar. The planar surface of the shaft 130 faces the clasp 140. A recess 134 is defined between the shaft 130 and the clasp 140.

A protrusion 144 is formed on the clasp 140. The protrusion 144 includes an angled surface 144a and a contact surface 144b connected to the angled surface 144a. The contact surface 144b faces the supporting plate 122. The contact surface 144b is convex. The clasp 140 is flexible material for easy assembly.

The transmitting wheel 150 includes a scored pulley 152 and a barrel 154. The pulley 152 is configured for receiving a transmission belt (not shown) thereon. The pulley 152 includes an upper surface 152b and a bottom surface 152c. The barrel 154 is formed on the middle of the bottom surface 152c of the pulley 152. The barrel 154 defines a through hole 154d. The shaft 130 and the clasp 140 are received in the barrel 154. When the shaft 130 and the clasp 140 are received in the barrel 154, the protrusion 144 of the clasp 140 fixes the upper surface 152b.

A plurality of gears 154a is formed on the exterior surface of the barrel 154. The transmitting wheel 152 further includes an upper surface 152b and a bottom surface 152c. The barrel 154 is mounted on the bottom surface 152c. The gears 154a are configured for precisely engaging gears of the motor (not shown).

When the shaft 130 and the clasp 140 are received in the barrel 154, the contact surface 144b engages the upper surface 152b of the pulley 152 in a smooth manner, such that minimal noise is caused by the clasp 140 and the transmitting wheel 150.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A locking apparatus of a CD-ROM drive, the locking apparatus comprising:
   a support comprising a shaft and a clasp formed thereon, the support arranged in a chassis of the locking apparatus; and
   a transmitting wheel rotatably coupled to the chassis, the transmitting wheel defining a barrel for rotatably receiving the shaft and the clasp;
   wherein the clasp clasps an end of the transmitting wheel away from the chassis to prevent the transmitting wheel from moving along the shaft and the clasp in a direction away from the chassis.

2. The locking apparatus as claimed in claim 1, wherein a protrusion is formed on the clasp, the protrusion clasps the end of the transmitting wheel away from the chassis to prevent the transmitting wheel from moving away from the chassis.

3. The locking apparatus as claimed in claim 2, wherein the support comprises a supporting plate on which the shaft and the clasp are formed.

4. The locking apparatus as claimed in claim 3, wherein the shaft is adjacent to the clasp.

5. The locking apparatus as claimed in claim 3, wherein a recess is defined between the shaft and the clasp.

6. The locking apparatus as claimed in claim 1, wherein the clasp is flexible material.

7. The locking apparatus as claimed in claim 1, wherein the barrel is formed on the middle of the transmitting wheel and extends axially.

8. The locking apparatus as claimed in claim 7, wherein a plurality of gears is formed on the exterior surface of the barrel.

9. The locking apparatus as claimed in claim 2, wherein the protrusion comprises an angled surface and a contact surface connected to the angled surface, the contact surface is convex and clasps the end of the transmitting wheel away from the chassis to prevent the transmitting wheel from moving away from the chassis.

10. A locking apparatus of a CD-ROM drive, the locking apparatus comprising:
 a chassis;
 a support arrange on the chassis, the support having a shaft and a clasp attach to the shaft; and
 a transmitting wheel rotatably coupled to the chassis, wherein the shaft and the clasp are an axle of the transmitting wheel and wherein a convex protrusion on the clasp clasps an end of the transmitting wheel away from the chassis to prevent the transmitting wheel from moving along the shaft and the clasp in a direction away from the chassis.

11. The locking apparatus as claimed in claim 10, wherein the clasp is spaced from the shaft to form a recess therebetween.

12. The locking apparatus as claimed in claim 11, wherein the convex protrusion is arranged on an end of the clasp away from the chassis and extends in a direction opposite to the shaft.

* * * * *